United States Patent [19]

Miller

[11] Patent Number: 5,150,865
[45] Date of Patent: Sep. 29, 1992

[54] UNIVERSAL FASTENER
[75] Inventor: Gregory P. Miller, Rochester, N.Y.
[73] Assignee: Xerox Corporation, Stamford, Conn.
[21] Appl. No.: 451,662
[22] Filed: Dec. 18, 1989
[51] Int. Cl.[5] .............................................. F16L 3/08
[52] U.S. Cl. .................................... 248/71; 248/74.1; 248/220.4; 411/510
[58] Field of Search ....................... 248/71, 74.1, 74.2, 248/74.4, 220.4, 505; 174/164, 156; 24/458, 453, 459, 297; 411/510, 913, 907, 908, 508, 509

[56] References Cited

U.S. PATENT DOCUMENTS

| | | | |
|---|---|---|---|
| 2,918,240 | 12/1959 | Wiegand | 248/71 |
| 3,098,273 | 7/1963 | Cochran | 24/73 |
| 4,175,728 | 11/1979 | Ferguson | 269/91 |
| 4,260,122 | 4/1981 | Fiala | 248/71 |
| 4,396,329 | 8/1983 | Wollar | 411/510 |
| 4,551,189 | 11/1985 | Peterson | 411/510 |
| 4,563,078 | 1/1986 | Fantuzzo | 355/200 |
| 4,728,238 | 3/1988 | Chisholm | 411/913 |
| 4,806,895 | 2/1989 | Petrow | 248/71 |

FOREIGN PATENT DOCUMENTS

| | | | |
|---|---|---|---|
| 221618 | 6/1962 | Austria | 24/459 |
| 1058117 | 5/1959 | Fed. Rep. of Germany | 174/156 |
| 1913260 | 9/1970 | Fed. Rep. of Germany | |
| 424381 | 5/1967 | Switzerland | 24/297 |

Primary Examiner—Carl D. Friedman
Assistant Examiner—Derek J. Berger

[57] ABSTRACT

A substantially U-shaped universal fastener for cooperative association with a pair of leg receptor slots in a substrate to fasten an elongated body therebetween, said fastener comprising two separated substantially parallel elongated flexible leg members joined at one end by a tying member, each of said elongated leg members having an interior and an exterior side, and on each of said interior and exterior sides, and a plurality of flanged flexible stop members vertically inclined toward said tying member.

25 Claims, 5 Drawing Sheets

UNIVERSAL FASTENER

BACKGROUND OF THE INVENTION

The present invention relates generally to fasteners for wires, wiring harnesses, cables and other elongated bodies. In particular, it relates to universal fasteners for fastening or otherwise securing wiring harnesses to supporting substrates in machines. A specific embodiment is directed to fastening the wiring harnesses in an electrostatographic printing machine.

In electrostatographic printing apparatus commonly used today a photoconductive insulating member is typically charged to a uniform potential and thereafter exposed to a light image of an original document to be reproduced. The exposure discharges the photoconductive insulating surface in exposed or background areas and creates an electrostatic latent image on the member which corresponds to the image contained within the original document. Alternatively, a light beam may be modulated and used to selectively discharge portions of the charged photoconductive surface to record the desired information thereon. Typically, such a system employs a laser beam. Subsequently, the electrostatic latent image on the photoconductive insulating surface is made visible by developing the image with developer powder referred to in the art as toner. Most development systems employ developer which comprises both charged carrier particles and charged toner particles which triboelectrically adhere to the carrier particles. During development the toner particles are attracted from the carrier particles by the charge pattern of the image areas of the photoconductive insulating area to form a powder image on the photoconductive area. This toner image may be subsequently transferred to a support surface such as copy paper to which it may be permanently affixed by heating or by the application of pressure.

In commercial applications of such products it is necessary to distribute power and/or logic signals to various sites within the machine. Traditionally, this has taken the form of utilizing conventional wires and wiring harnesses in each machine to distribute power and logic signals to the various functional elements in an automated machine. Typically, these wiring harnesses and other wires have been secured to the supporting or guiding substrates of the machine by using tie wraps which are typically threaded through rectangular holes requiring access to both sides of the supporting substrate and after tightening may require the removal of the tail portion near the knot due to space and other functional constraints. Furthermore, frequently the knot has to be oriented due to space limitation. In total, this procedure is highly labor intensive, and may even involve manual operations such as threading from the bottom of a supporting substrate that may have to be accomplished without being able to view the location, all of which is time consuming and extremely costly.

PRIOR ART

In addition to the use of conventional plastic tie wraps, U-shaped electrical wire staples are well known in securing wiring to structural members particularly wooden frame members.

U.S. Pat. No. 4,175,728 to Furgeson discloses an adjustable cable clamp which has two legs forming a U-shaped configuration. The clamp has a number of ratchet-like teeth, homologously disposed on the inner surfaces of the legs, a spring member on the inner surface of the base of the clamp and a pair of projections to enable disengagement of the teeth with the chassis.

SUMMARY OF THE INVENTION

The present invention is directed to a substantially U-shaped universal fastener to fasten an elongated body to a substrate through cooperative association of a pair of legs with receptor slots in the substrate which fastener fasteners comprises two separated substantially parallel elongated flexible leg members joined at one end by a tying member, each of the leg members having an interior and exterior side and on each of the interior and exterior sides, a plurality of flanged, flexible stop members vertically inclined towards said tying member. In a further aspect of the present invention, the U-shaped universal fastener is used to fasten a wiring harness or wire to a substrate in a machine and in particular to an electrostatographic printing machine.

In a further aspect of the present invention, the stop members on each of the respective interior and exterior sides of the leg members are displaced relative to each other in a direction parallel to the axis of the leg members by about one-half the distance between the stop members.

In a further aspect of the present invention, the stop members form a angle of from about 40° to 50° and preferably 45° with the axis of the leg members.

In a further aspect of the present invention, the tying member is more rigid than the leg members.

In a further aspect of the present invention, the stop members at the ends of the legs are also vertically inclined toward the tying member in a direction transfers to the vertical inclination.

In a further aspect of the present invention, the leg members have a first terminating portion supporting the stop members and a second portion connected to the tying member which does not have stop members and wherein the cross sectional area of the first portion is substantially the same along its length.

In a further aspect of the present invention, the stop members are thinner in thickness than the leg members.

In a further aspect of the present invention, the fasteners are made of a one-piece molded polymer in a particular polypropylene.

In a further aspect of the present invention, the shape and cross sectional area of the second portion of the leg members is substantially the same as the tying member.

In a further aspect of the present invention, the first portion of the leg member has a sinuous pattern.

In a further aspect of the present invention the stop members are in a ratchet-like toothed configuration

DETAILED DESCRIPTION OF THE INVENTION

In accordance with the present invention, a substantially U-shaped universal fastener which is used to fasten a elongated body to some substrate through the cooperative association or engagement by a pair of legs with receptor slots in the substrate is provided that is capable of being fastened in a plurality of ways with one or more and up to four rows of stop members. By the term elongated body is intended to define wires, wiring harnesses, tubes, pipes and the like as well as other geometric shapes which are capable of being secured to a substrate with the U-shaped fastener according to the present invention.

Figure 1:
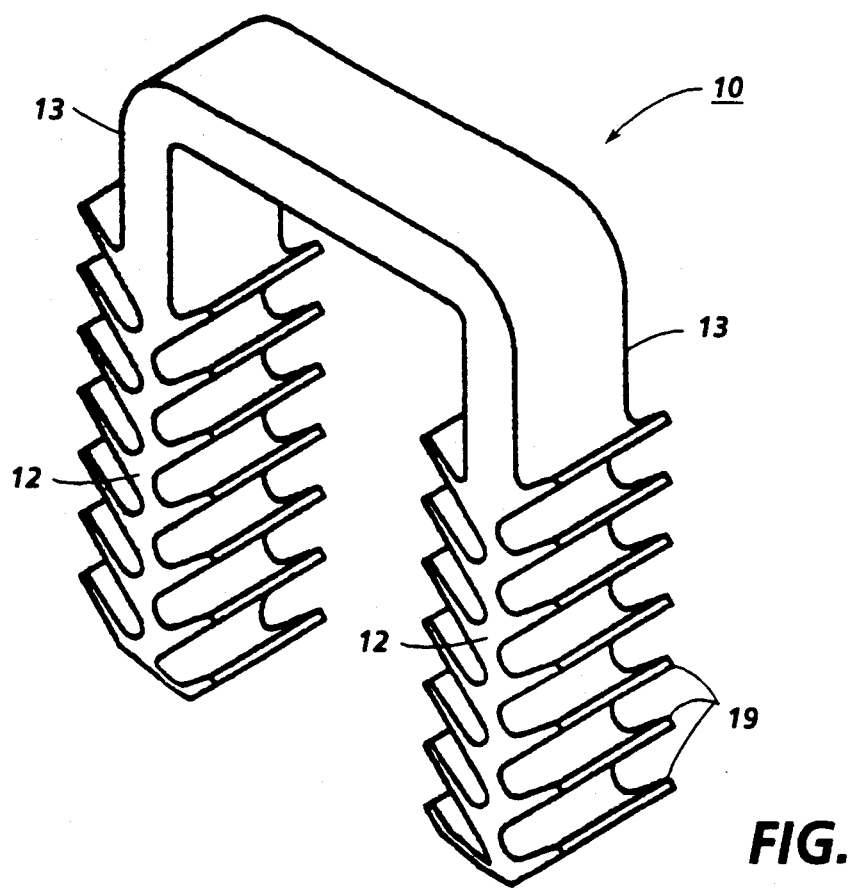
FIG. 1 is an isometric view of the U-shaped universal fastener of the present invention.
Figure 2:
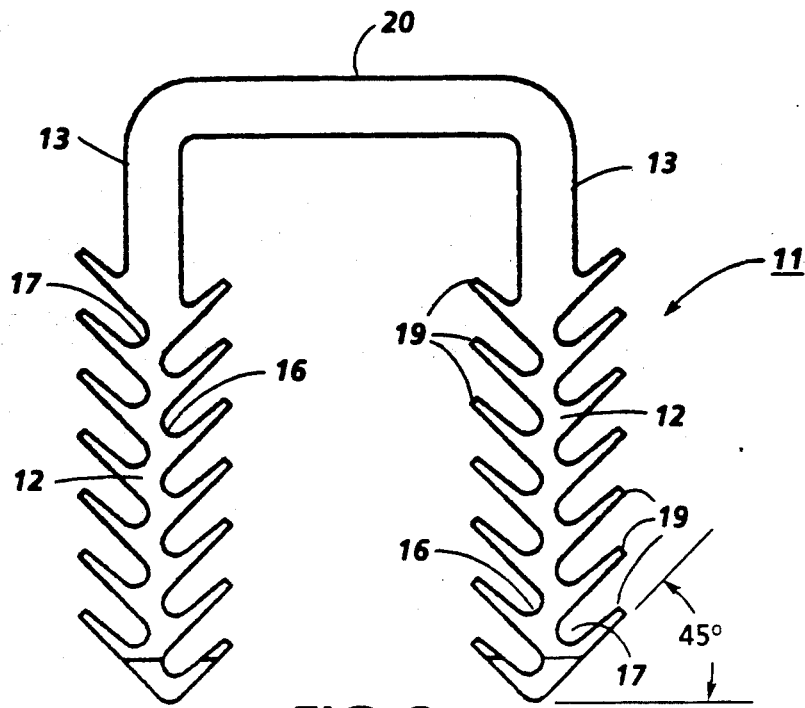
FIG. 2 is a view in cross section of the U-shaped universal fastener according to the present invention.

Attention is directed to FIGS. 1 and 2 for an appreciation of the features of the universal fastener according to the present invention. As observed, the fastener may comprise a single piece molded plastic comprising two separators substantially parallel, elongated flexible leg members 11 each joined at one end by a tying member 20 to form the U-shaped fastener 10. Each of the leg members is preferably resiliently flexible so that it can be slightly displaced from its normal position to enable insertion into insertion slots of slightly varying spaced apart distances. The leg members have a terminating portion 12 which supports a plurality of stop members 19 on both the interior side 16 and exterior side 17 of each of the let members 11. By the term interior side it is intended to define that side of the U-shaped portion wherein the sides of the legs are within the U and face each other, the exterior portion being on the opposite side of the legs as illustrated in FIGS. 1 and 2. The leg members 11 also have a second portion which does not have stop members which serves to tie the portion with the stop members to the typing member 20.

Figure 8:
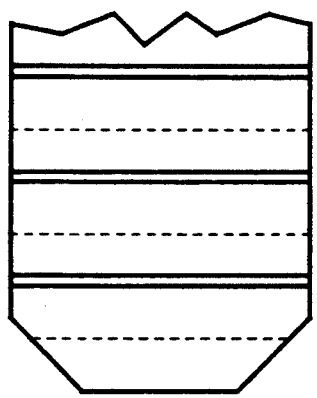
FIG. 8 is a side view of one of the legs as illustrated in FIG. 1.

As illustrated in FIG. 1 and more clearly observed with reference to FIG. 2, the portion of the leg member having the stop members has a generally sinuous pattern and the stop members 19 form a ratchet-like toothed configuration. Therefore the stop members on each of the respective interior and exterior sides of the leg members are displaced relative to each other in a direction perpendicular to the axis of the leg member by about one half the distance between the stop members. This construction enables a relatively uniform wall thickness of each of the leg members and thereby relative uniformity of strength and flexibility. It also enables an increase to almost doubling the number of stop members that may be used on each side of the leg member thereby enabling a finer adjustment of the universal fastener on both sides of the leg member. Each of the interior 16 and exterior sides 17 of the two leg members 11 has a plurality of stop members vertically inclined toward the tying member 20 and generally in the direction away from the direction of insertion. The angle of the flanged flexible stop members with respect to the leg member $\theta$ as illustrated in FIG. 2 is selected to facilitate the appropriate balance between ease of insertion of the universal fastener and the gripping power of the universal fastener. Typically, this angle $\theta$ is from about 40° to about 50° and in a preferred embodiment is about 45°. It is noted that the greater the angle the easier to insert the universal fastener, however, the gripping power is reduced whereas the shallower the angle it becomes more difficult to insert the universal fastener but it provides greater gripping power. In addition and as illustrated in the side view of FIG. 8, the stop members at the ends of the legs are also vertically inclined toward the tying member in a direction transverse to the vertical inclination of the plurality of stop members.

To further facilitate fastener insertion in the insertion slots the stop members of the fastener may be made more flexible by reducing their thickness. Typically, in this regard the thickness of the stop members is thinner than the thickness of the leg members. With regard to thicknesses of the individual members it is noted that both FIGS. 1 and 2 illustrate a preferred embodiment wherein the second member has substantially the same shape and cross sectional area as the tying member. There may, however, be applications where it will be desired that the tying member be more rigid than each of the legs members in which case this rigidity can be provided by increasing the thickness of the tying member.

The universal fastener has a wide range of applications and can be used in a variety of sizes having openings between the two leg members of the order of a quarter of an inch or perhaps even less and up to several feet. Depending upon the application the fastener may be made in any of several ways. It may be made, for example, by the fabrication of the separate leg members and the tying member followed by suitable joining of those members with bolts or screws and the like. This would most likely have application for the larger fasteners, which could be fabricated from, for example, metal (steel, stainless steel, aluminum. For most wiring harness fastening applications, however, it is preferred to make the fastener as a one piece molded polymer. Such a one piece molded fastener may be made from any suitable material. Typical materials include, nylon, Delrin, ABS and polypropylene, it being noted that the nylon, ABS Delrin tend to provide relatively rigid legs and stop members compared to the polypropylene which is more resiliently flexible with greater opportunity for reuse without breaking.

Figure 3:
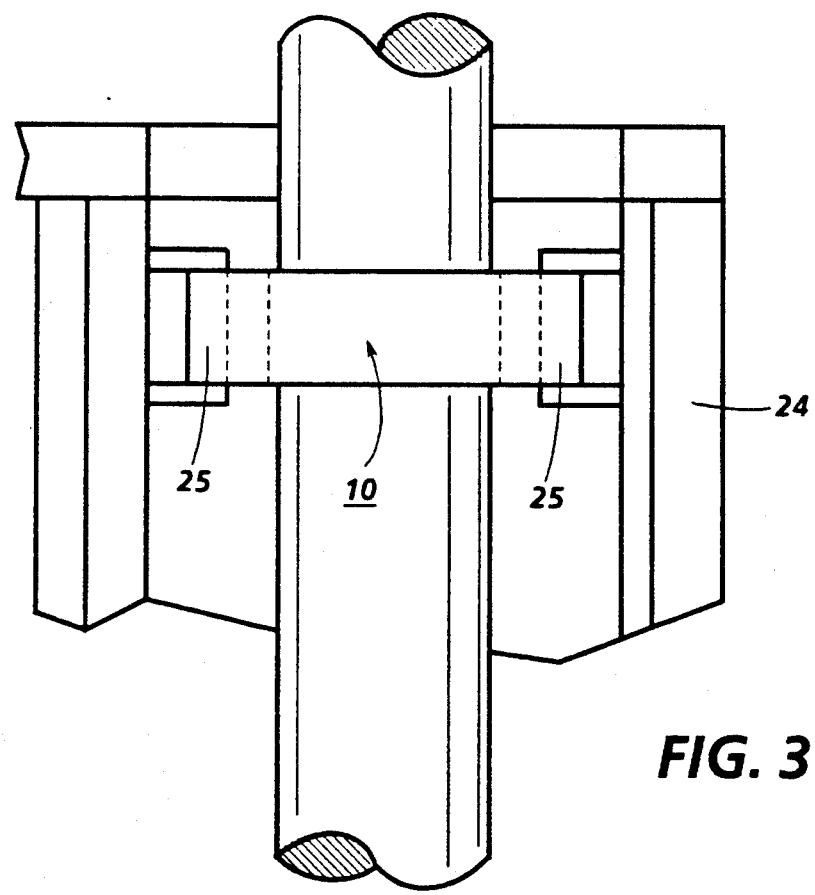
FIG. 3 is a top view of a substrate containing receptor slots for the universal fastener according to the present invention with the fastener in the slots.
Figure 4:
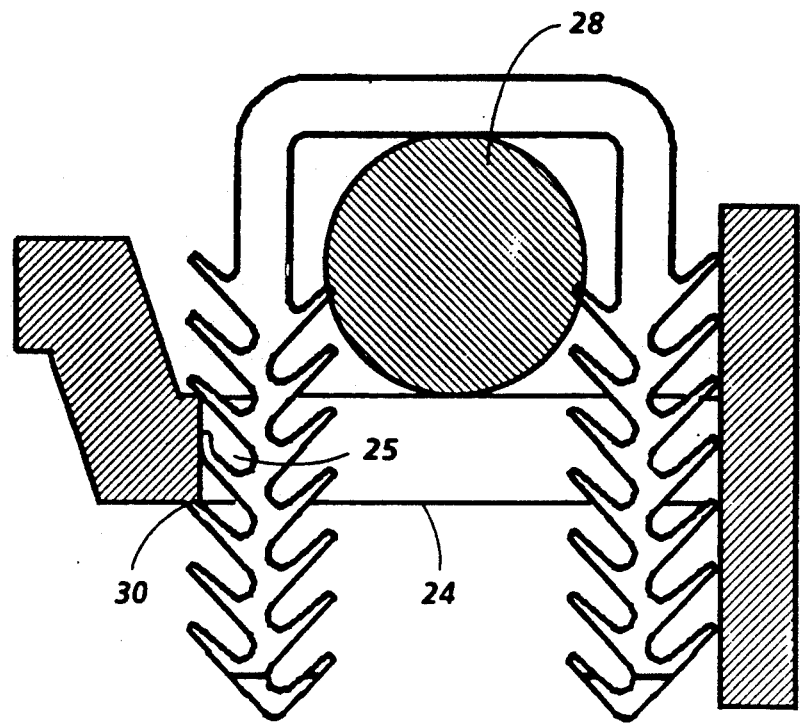
FIG. 4 is a view in cross section of the universal fastener in position in the substrate receptor slots holding a wire bundle in place.
Figure 5:
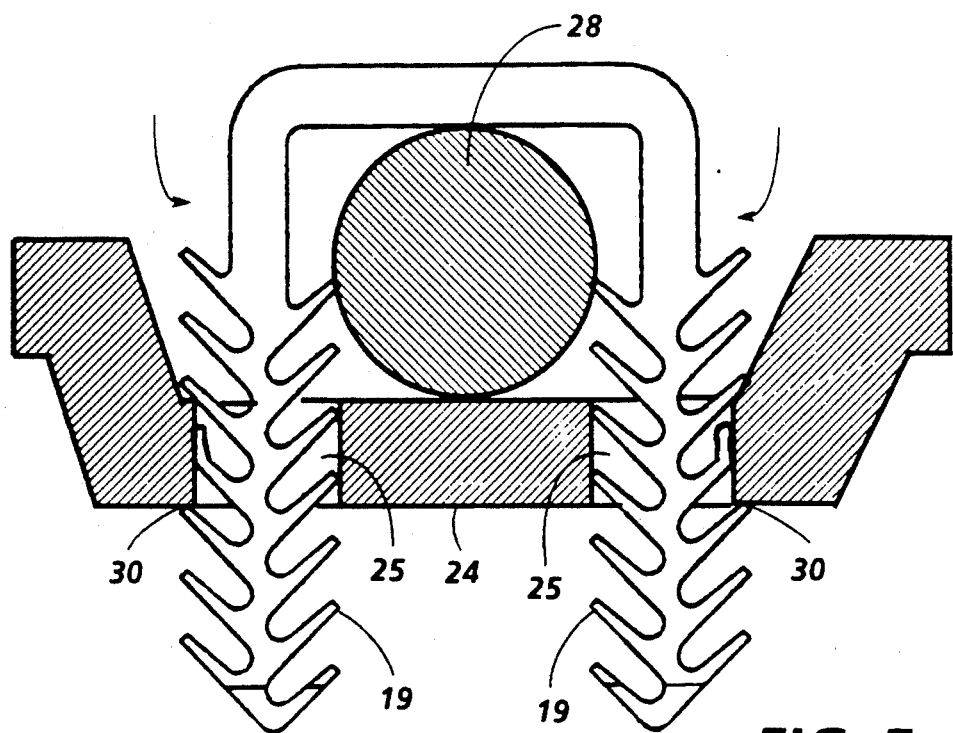
FIGS. 5, 6 and 9 illustrate an additional alternative manners of operation in cross section of the universal fastener according to the present invention.

Attention is directed to FIGS. 3, 4 and 5 for the manner of operation of the universal fastener. The universal fastener is used with a substrate to which it becomes fastened by cooperative association or engagement of one or more of the plurality of stop members 19 on the leg members. Typically, the fastener is manually inserted such that the terminating ends of the leg members are introduced to the insertion slots 25 in the substrate 24. Since the stop members are angled in the direction away from the direction of insertion and are flexible, they will bend readily when in interference contact with any surface surrounding the insertion slots in the substrates. During insertion, it is possible to hear the individual flexible stop members being flicked or clicked past the stopping surface of the insertion slots. Typically on insertion of the universal fastener it is inserted manually with a force until a resistance is felt that the elongated body has been fastened to the substrate.

Figure 6:
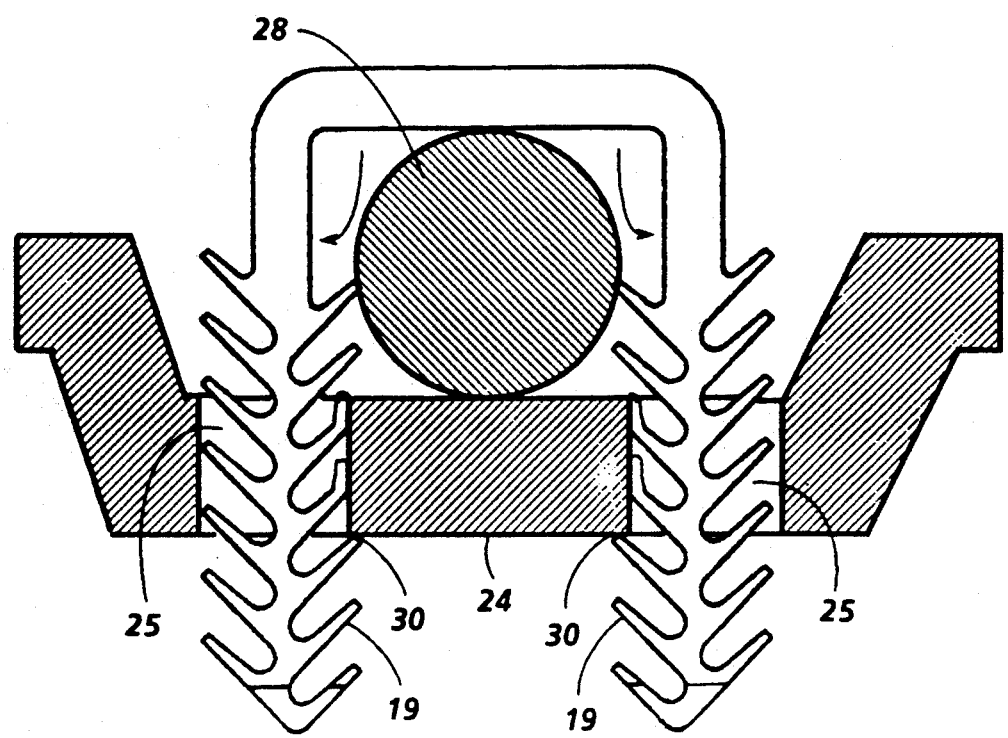
Figure 9:
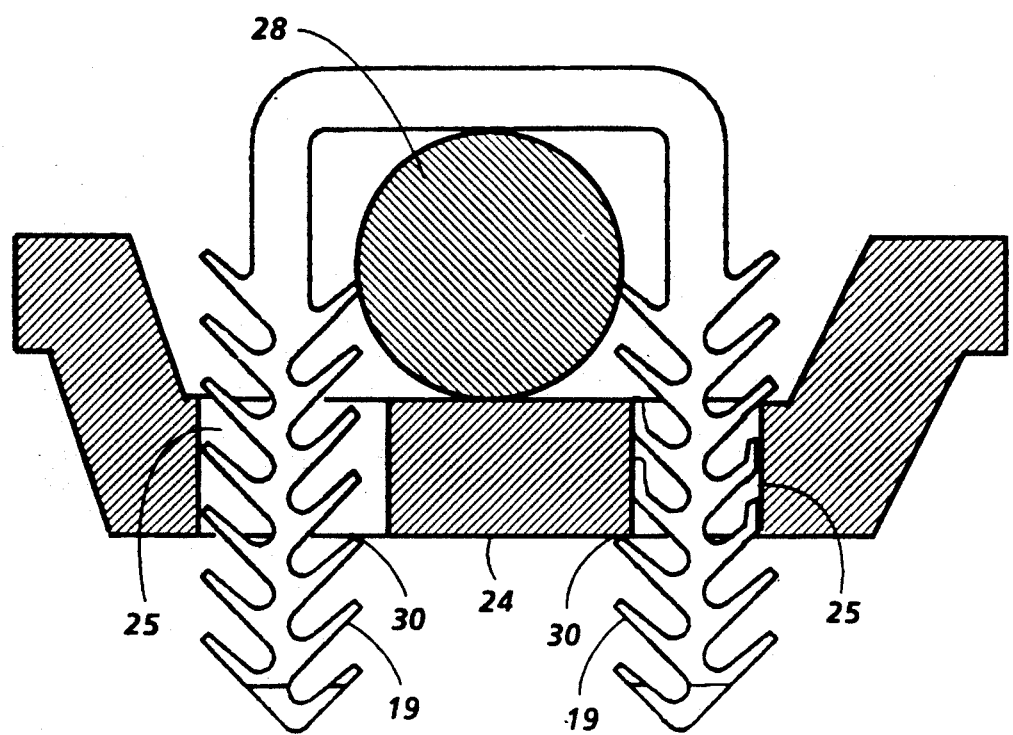

It will be appreciated that while the insertion slots have been illustrated as being generally square in geometry that the insertion slots may be round or oval it being required only that the insertion slots have an angular or cornered-type surface with which the flexible stop members can come into engagement and obtain a good grip. Since the leg members of the fastener are flexible, each particular size fastener is capable of being used with insertion slots and substrates that have a range of distances between them. Thus, the flexible legs of the universal fastener may be slightly compressed or slightly expanded for use in a small range of sizes between pairs of insertion slots. As illustrated in FIGS. 3, 4, 5 and 6 the universal fastener has several modes of operation in which it can be used to secure an elongated body to a substrate. Since there are four groups or rows of flexible stop members, it has four opportunities within which to grip an engaging surface with the substrate on insertion. FIG. 4 illustrates the insertion of a fastener in receptor slots 25 wherein a wire bundle 28 is secured to a substrate 24 by the group of stop members on the exterior side of the left leg member in engagement with the edge 30 of the insertion slot 25. It should be noted that the right side of the fastener rides against the planar surface and is not in engagement with any edge of a receptor slot. Similarly, FIG. 5 illustrates the universal fastener wherein the wire harness is secured to the substrate 24 by the two exterior groups of stop members being in engagement with the edge of the insertion slot. FIG. 6 illustrates the engagement of the two interior groupings of stop members 19 in engagement with an edge 30 of the insertion slot. On each insertion, once each of the stop members is moved into the insertion slot, it moves in a position to potentially grip the edge of the insertion slot to resist withdrawal of the fastener from the insertion slot. FIGS. 5 and 6 also illustrate the binding action of the flexible legs to accommodate insertion slots of different sizes. As illustrated in FIG. 5 the legs are bent slightly inwardly and in FIG. 6 the legs are bent slightly outwardly. In the alternative embodiment of FIG. 9 the stop members 19 on both the interior and exterior sides of the right leg are each in engagement with the edge 30 of the insertion slot 25. It will, of course, be appreciated that the stop members on both sides of both legs may be in engagement with the edges of the insertion slot.

Figure 7:
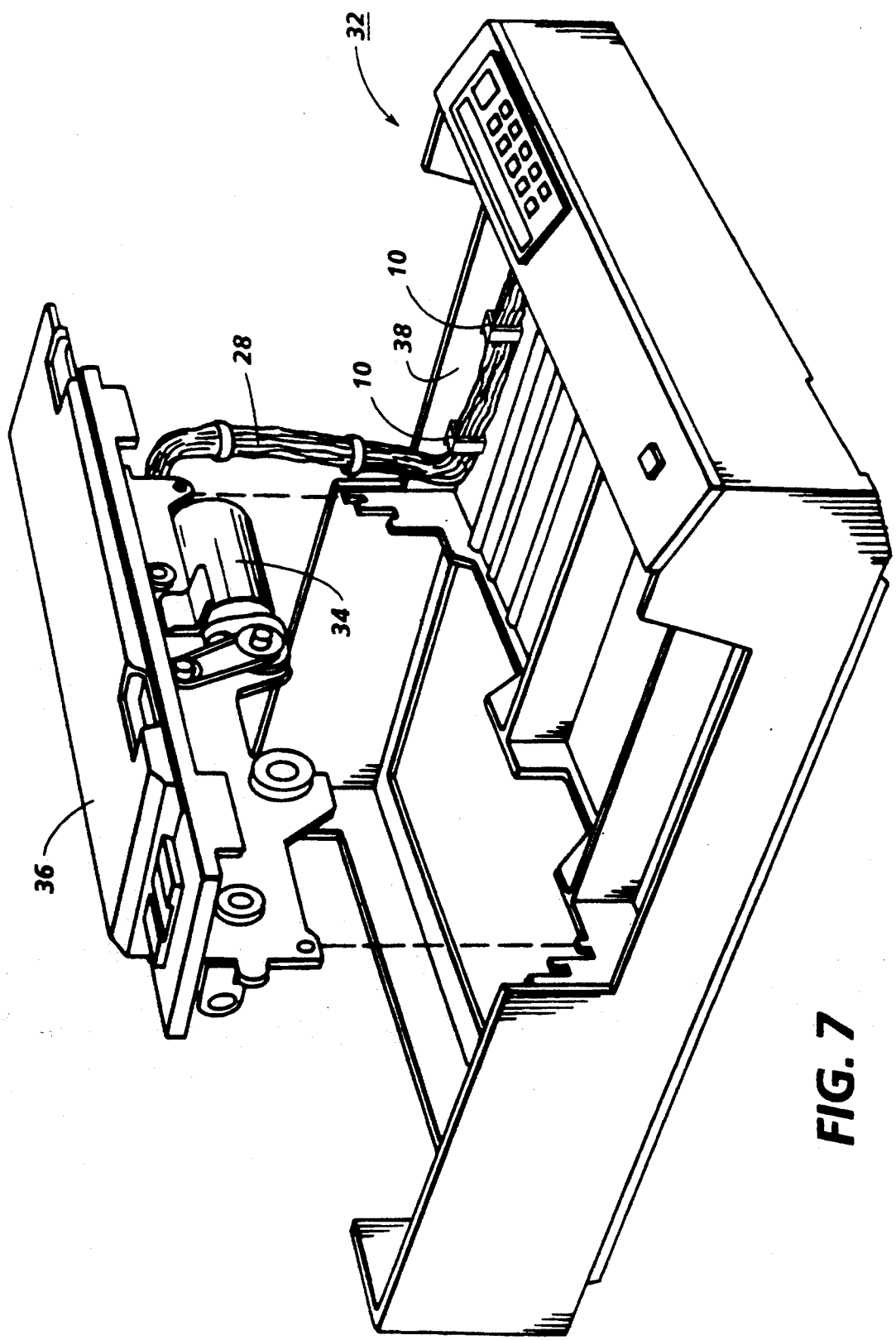
FIG. 7 is an isometric representation of a machine having a wiring harness secured thereto with the universal fastener according to the present invention.

Attention is directed to FIG. 7 for a representation of how the universal fastener according to the present invention may be used in a machine 32. Here illustrated as only a structural frame 32 together with a machine drive module 34 and platen drive module 36 are illustrated as part of an electrostatographic reproducing apparatus. For a further description of the machine elements and its manner of operation, attention is directed to U.S. Pat. No. 4,563,078 to Fantuzzo et al. As illustrated in FIG. 7, a wiring harness 28 is secured to a substrate such as a frame mounting support 38 through the use of the universal U-shaped fastener according to the present invention.

According to the present invention, a universal fastener capable of securing an elongated body to a substrate in four different ways has been provided. In addition, this fastener has the capability of fastening different size elongated bodies such as wires or wiring harnesses as well as the flexibility of being used with different spacing between receptor slots. Furthermore, it can be used to fasten elongated body even when placed up against the a planar surface. It has the advantage that it can be molded in one piece in an economical manner and made in several sizes. Furthermore, it facilities assembly of an elongated body by being able to be easily piloted manually by one hand into an insertion slot from only one side of the substrate thereby enabling easier and faster insertion and saving time and money.

The disclosures of the patents referred to herein are hereby specifically and totally incorporated herein by reference.

While the invention has been described with reference to specific embodiments it will be apparent to those skilled in the art that many alternatives, modifications and variations may be made. For example, while the invention has been generally illustrated in securing a wire or wiring harness to a substrate it will be appreciated that it can secure virtually any elongated member to a receptive surface. Furthermore, while the invention has been discussed with reference to use in electrostatographic printing apparatus, it will be appreciated that as application in virtually any and all machines. Accordingly, it is intended to embrace all such alternatives and modifications as may fall within the spirit and scope of the appended claims.

I claim:

1. A substantially U-shaped one piece universal fastener for cooperative association with a pair of leg receptor slots in a substrate to fasten an elongated body therebetween, said fastener comprising two separated substantially parallel elongated flexible leg members joined at one end by a tying member, each of said elongated leg members having an interior and an exterior side, and on each of said interior and exterior sides, a plurality of flanged flexible stop members vertically inclined toward said tying member and forming an angle of from about 40° to about 50° with the axis of said leg member.

2. The fastener of claim 1 wherein the stop members on each of the respective interior and exterior sides of said two leg members are displaced relative to each other in a direction parallel to the axis of each of said two leg members by a distance equal to about one half the distance between adjacent stop members.

3. The fastener of claim 1 wherein said stop members form an angle of about 45° with the axis of said leg member.

4. The fastener of claim 1 wherein the tying member is more rigid than said leg members.

5. The fastener of claim 1 wherein the stop members on the ends of the legs are also vertically inclined toward said tying member in a second direction transverse to the vertical inclination of the other stop members.

6. The fastener of claim 1 wherein said leg member comprises a first terminating portion supporting said stop members and a second portion connected to said tying member which does not have stop members and wherein the cross sectional area of said first portion is substantially the same along its length.

7. The fastener of claim 6 wherein the shape and cross sectional area of said second portion of said leg members is substantially the same as the tying member.

8. The fastener of claim 6 wherein the first portion of said leg member has a "sinuous" configuration.

9. The fastener of claim 1 wherein said stop members are thinner in thickness than said leg members.

10. The fastener of claim 1 which is made of a one-piece molded polymer.

11. The fastener of claim 10 wherein the polymer is polypropylene.

12. The fastener of claim 1 wherein the stop members are in a ratchet-like toothed configuration.

13. A machine having at least one elongated body, a substrate to which said body is fastened by a fastener, said substrate having at least one pair of leg receptor slots therein for cooperative association with a fastener therein to fasten said elongated body therebetween, said fastener comprising a substantially U-shaped one piece universal fastener for cooperative association with said pair of leg receptor slots in said substrate to fasten said elongated body therebetween and comprising two separated substantially parallel elongated flexible leg members joined at one end by a tying member, each of said elongated leg members having an interior and an exterior side, and on each of said interior and exterior sides a plurality of flanged flexible stop members vertically inclined toward said tying member and forming an angle of from about 40° to about 50° with the axis of said leg member.

14. The machine of claim 13 wherein the stop members on each of the respective interior and exterior sides of two leg members are displaced relative to each other in a direction parallel to the axis of each of said two leg members by a distance equal to about one half the distance between adjacent stop members.

15. The machine of claim 13 wherein said stop members form an angle of about 45° with the axis of said leg member.

16. The machine of claim 13 wherein the tying member is more rigid than said leg members.

17. The machine of claim 13 wherein the stop members on the ends of the legs are also vertically inclined toward said tying member in a second direction transverse to the vertical inclination of the other stop members.

18. The machine of claim 13 wherein said leg member comprises a first terminating portion supporting said stop members and a second portion connected to said tying member which does not have stop members and wherein the cross sectional area of said first portion is substantially the same along its length.

19. The machine of claim 18 wherein the shape and cross sectional area of said second portion of said leg members is substantially the same as the tying member.

20. The machine of claim 18 wherein the first portion of said leg member has a "sinuous" configuration.

21. The machine of claim 13 wherein said stop members are thinner in thickness than said leg members.

22. The machine of claim 13 which is made of a one-piece molded polymer.

23. The machine of claim 22 wherein the polymer is polypropylene.

24. The machine of claim 13 wherein the stop members are in a ratchet like toothed configuration.

25. The machine of claim 13 wherein said machine is an electrostatographic printing machine.

* * * * *